(12) United States Patent
Chen et al.

(10) Patent No.: US 11,336,402 B2
(45) Date of Patent: May 17, 2022

(54) CONFIGURATION AND SELECTION OF HARQ FEEDBACK RESOURCES IN A WIRELESS COMMUNICATION SYSTEM

(71) Applicant: Mediatek Singapore Pte. Ltd., Singapore (SG)

(72) Inventors: Tao Chen, Beijing (CN); Pei-Kai Liao, Hsin-Chu (CN); Chien-Yi Wang, Hsin-Chu (CN); Ju-Ya Chen, Hsin-Chu (CN)

(73) Assignee: Mediatek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/964,856

(22) PCT Filed: Nov. 1, 2019

(86) PCT No.: PCT/CN2019/115017
§ 371 (c)(1),
(2) Date: Jul. 24, 2020

(87) PCT Pub. No.: WO2020/088648
PCT Pub. Date: May 7, 2020

(65) Prior Publication Data
US 2021/0250132 A1   Aug. 12, 2021

(30) Foreign Application Priority Data
Nov. 2, 2018  (WO) ................ PCT/CN2018/113809

(51) Int. Cl.
*H04W 4/00*   (2018.01)
*H04L 1/18*   (2006.01)
*H04B 7/06*   (2006.01)

(52) U.S. Cl.
CPC ......... *H04L 1/1819* (2013.01); *H04B 7/0626* (2013.01); *H04B 7/0632* (2013.01); *H04L 1/1896* (2013.01)

(58) Field of Classification Search
CPC ... H04L 1/1819; H04L 1/1896; H04L 5/0007; H04B 7/0626; H04B 7/0632;
(Continued)

(56) References Cited

U.S. PATENT DOCUMENTS 8,208,936 B2   6/2012  Lindoff et al.
2010/0281322 A1  11/2010  Park et al.
(Continued)

FOREIGN PATENT DOCUMENTS

CN   102144366 A   8/2011
CN   108616339 A   10/2018
(Continued)

OTHER PUBLICATIONS

Office Action dated May 26, 2021 in corresponding Taiwanese Patent Application No. 108139772, 3 pages.
(Continued)

*Primary Examiner* — Chuong T Ho
(74) *Attorney, Agent, or Firm* — Oblon, McClelland, Maier & Neustadt, L.L.P.

(57) ABSTRACT

A method of hybrid automatic repeat request (HARQ) feedback can include receiving data transmitted from a transmission (Tx) user equipment (UE) or a base station (BS) over a channel at a reception (Rx) UE, selecting an acknowledgement/negative acknowledgement (A/N) resource from a set of A/N resources for a HARQ feedback of the data based on a channel condition of the channel or a geographical location of the Rx UE, and transmitting the HARQ feedback with the selected A/N resource.

20 Claims, 5 Drawing Sheets

(58) Field of Classification Search
CPC ..... H04W 80/04; H04W 88/06; H04W 88/08; H04W 28/04; H04W 72/04; H04W 72/0446
USPC .................................................. 370/329, 330
See application file for complete search history.

(56) References Cited

U.S. PATENT DOCUMENTS

| | | | |
|---|---|---|---|
| 2012/0008600 A1* | 1/2012 | Marinier | H04W 56/0005 370/336 |
| 2017/0332213 A1 | 11/2017 | Xu et al. | |
| 2018/0254872 A1* | 9/2018 | Seo | H04L 5/0055 |
| 2020/0221444 A1* | 7/2020 | Tiirola | H04L 1/1812 |

FOREIGN PATENT DOCUMENTS

| | | |
|---|---|---|
| WO | WO 2018/080151 A1 | 5/2018 |
| WO | WO 2018/082059 A1 | 5/2018 |

OTHER PUBLICATIONS

International Search Report and Written Opinion dated Jan. 17, 2020 in PCT/CN2019/115017 filed on Nov. 2, 2018.
Combined Taiwanese Office Action and Search Report dated Sep. 30, 2020 in Taiwanese Patent Application No. 108139772 (with English translation of categories of cited documents), 6 pages.
Chinese Office Action dated Nov. 17, 2021 and Search Report dated Nov. 11, 2021 in Chinese Application No. 201980004452.8, 13 pgs.

* cited by examiner

| UE SUBGROUP | S-RSRP RANGE | A/N RESOURCES FOR NACKs |
|---|---|---|
| SUBGROUP #1 | S-RSRP ≥ −80 dBm | A/N RESOURCE #1 |
| SUBGROUP #2 | −80 dBm > S-RSRP ≥ −100 dBm | A/N RESOURCE #2 |
| SUBGROUP #3 | −100 dBm > S-RSRP | A/N RESOURCE #3 |

FIG. 4

| UE SUBGROUP | CQI INDEX RANGE | A/N RESOURCES FOR NACKs |
|---|---|---|
| SUBGROUP #1 | 0~9 | A/N RESOURCE #1 |
| SUBGROUP #2 | 10~19 | A/N RESOURCE #2 |
| SUBGROUP #3 | 20~28 | A/N RESOURCE #3 |
| SUBGROUP #4 | OUT-OF-RANGE | NO A/N RESOURCE (DISABLE HARQ) |

CONFIGURATION AND SELECTION OF HARQ FEEDBACK RESOURCES IN A WIRELESS COMMUNICATION SYSTEM

INCORPORATION BY REFERENCE

This present application claims the benefit of International Application No. PCT/CN2018/113809, "Physical Layer Procedures for V2X Communication" filed on Nov. 2, 2018, which is incorporated herein by reference in its entirety.

TECHNICAL FIELD

The present disclosure relates to wireless communications, and specifically relates to communications for vehicular applications and enhancements to cellular infrastructure.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cellular based vehicle-to-everything (V2X) (e.g., LTE V2X or NR V2X) is a radio access technology developed by the Third Generation Partnership Project (3GPP) to support advanced vehicular applications. In V2X, a direct radio link (referred to as a sidelink) can be established between two vehicles. The sidelink can operate under the control of a cellular system (e.g., radio resource allocation) when the vehicles are within the coverage of the cellular system. Or, the sidelink can operate independently when no cellular system is present.

SUMMARY

Aspects of the disclosure provide a method of hybrid automatic repeat request (HARQ) feedback. The method can include receiving data transmitted from a transmission (Tx) user equipment (UE) or a base station (BS) over a channel at a reception (Rx) UE, selecting an acknowledgement/negative acknowledgement (A/N) resource from a set of A/N resources for a HARQ feedback of the data based on a channel condition of the channel or a geographical location of the Rx UE, and transmitting the HARQ feedback with the selected A/N resource.

In an embodiment, the A/N resource is selected based on a mapping relationship between different ranges of a channel condition indicator and the set of A/N resources. According to an example, the mapping relationship is (pre-) configured. In an embodiment, the channel condition indicator is at least one of a channel quality indicator (CQI), a distance between the Tx UE or BS and the Rx UE, a reference signal received power (RSRP), a reference signal received quality (RSRQ), or a path loss.

In an embodiment, a region surrounding the Tx UE or BS is partitioned into zones, and the A/N resource is selected based on the zone where the Rx UE is located. In an embodiment. A beamforming is performed towards the zone where the Rx UE is located when transmitting the HARQ feedback.

In an embodiment, the set of A/N resources include a common resource shareable among UEs, and a dedicated resource configured for the Rx UE. A cell representing a serving area of the Tx UE or BS is partitioned into a cell center region and a cell edge region. The common resource is selected when the Rx UE is located at the cell center region, while the dedicated resource is selected when the Rx UE is located at a cell edge region.

In an embodiment, the set of A/N resources is a set of common resources each shareable among UEs in a groupcast communication. In an embodiment, the set of A/N resources is a set of dedicated resources configured for the Rx UE. In an embodiment, a rule for selecting the A/N resource from the set of A/N resources is received from the Tx UE or BS, or preconfigured to the Rx UE, and the set of A/N resources is indicated by a configuration received from the Tx UE or BS, or is preconfigured to the Rx UE, or is indicated by physical control channel (e.g., SL physical control channel or uu physical control channel). In an embodiment, the HARQ feedback is one of a negative acknowledgement (NACK) only HARQ feedback, or an acknowledgement (ACK) or NACK feedback.

In an embodiment, the method further includes acquiring a channel condition component of channel state information (CSI) of the channel based on a measurement over a first predefined short timescale, and acquiring an interference/noise level component of the CSI of the channel based on a measurement over a second predefined short timescale or a predefined long timescale depending on a sensing history of interference/noise over the channel.

In an example, interference/noise level component of the CSI of the channel is acquired based on the measurement over the second predefined short timescale when the interference/noise over the channel changes slow compared with a threshold, or based on the measurement over the predefined long timescale when the interference/noise over the channel changes fast compared with the threshold.

In an example, the CSI is reported using a first and a second channel quality indicator (CQI) tables corresponding to the measurements of the second predefined short timescale and the predefined long timescale, respectively. A gap between two consecutive entries of the first CQI table is larger than that of the second CQI table.

Aspects of the disclosure provide another method for HARQ feedback. The method can include transmitting a configuration from a Tx UE or a BS to a Rx UE in a wireless communication system. The configuration indicates a rule for selecting an A/N resource from a set of A/N resources for a HARQ feedback based on a channel condition of a channel between the Tx UE or BS and the Rx UE, or a geographical location of the Rx UE. Data is transmitted to the Rx UE over the channel. A first HARQ feedback corresponding to the transmitted data is received from the Rx UE. The first HARQ feedback is carried in a first A/N resource selected from the set of A/N resources according to the rule.

Aspects of the disclosure provide a UE that includes circuitry. The circuitry is configured to receive data transmitted from a Tx UE or a BS over a channel, select an A/N resource from a set of A/N resources for a HARQ feedback of the data based on a channel condition of the channel or a geographical location of the UE, and transmit the HARQ feedback with the selected A/N resource.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
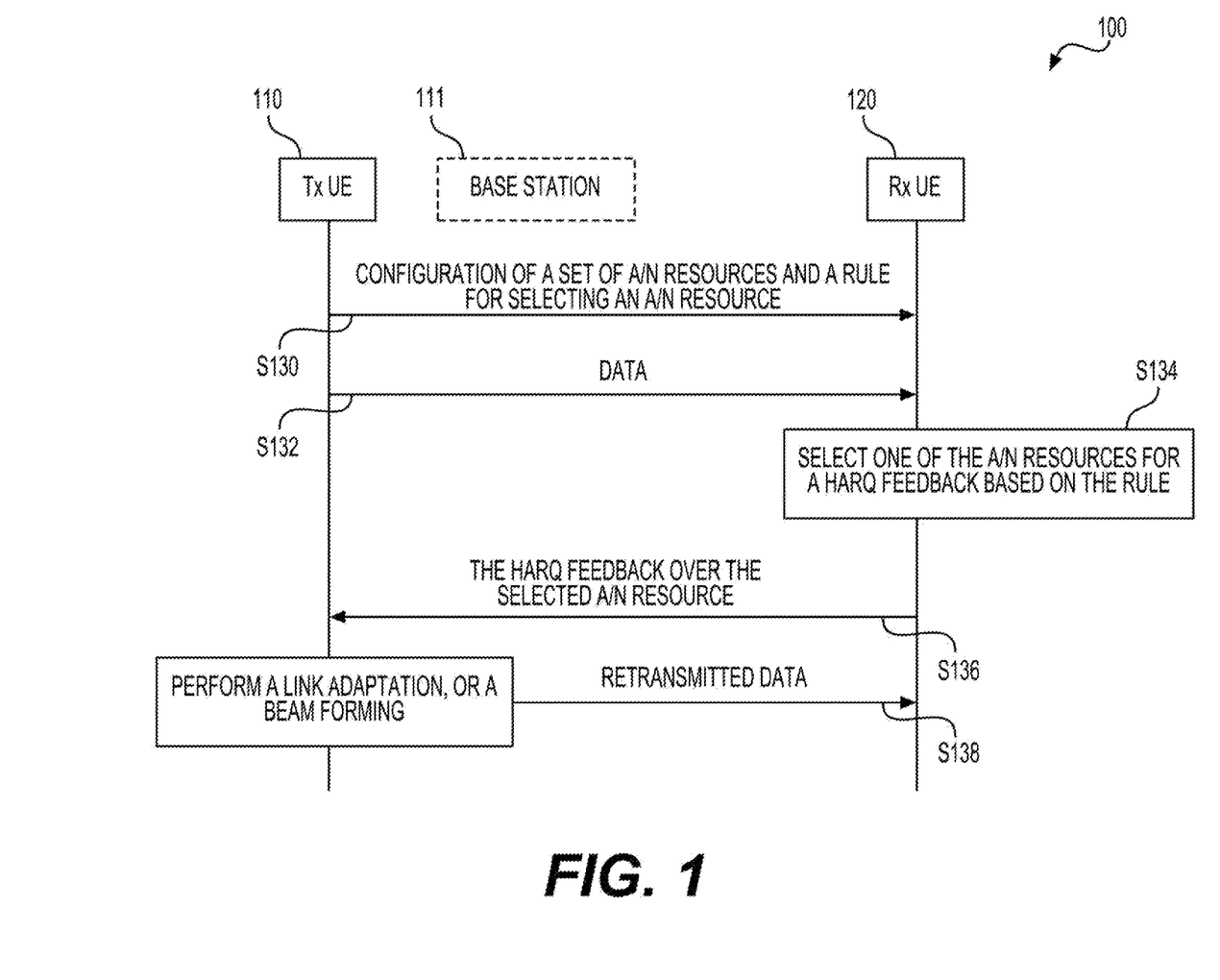
FIG. 1 shows a data retransmission process between a transmission (Tx) user equipment (UE) and a reception (Rx) UE in a wireless communication system according to some embodiments of the disclosure.

FIG. 1 shows a data retransmission process 100 between a transmission (Tx) user equipment (UE) 110 and a reception (Rx) UE 120 in a wireless communication system according to some embodiments of the disclosure. The Tx UE 110 and the Rx UE 120 can each be a vehicle, a computer, a mobile phone, or the like. The Tx UE 110 and Rx UE 120 can communicate with each other, for example, based on vehicle-to-everything (V2X) technologies specified in 3GPP standards.

For example, a direct radio link, referred to as a sidelink, can be established between the UEs 110 and 120 for communications between the UEs 110 and 120. The sidelink can share a spectrum used by the UE 110 or 120 for uplink communications with a base station (BS) in a cellular system, or can be a licensed or unlicensed spectrum other than the spectrum used in the cellular system. Allocation of radio resources over the sidelink can be controlled by the BS serving the UEs 110 and 120, or can be controlled by the Tx UE 110, for example, when the UEs 110 and 120 are out of coverage of the cellular system.

In an embodiment, the process 100 implement a hybrid automatic repeat request (HARQ) scheme for data retransmission. In this HARQ scheme, a set of radio resources for HARQ positive acknowledgement (ACK) or negative acknowledgement (NACK), denoted as A/N resources, can be configured for a HARQ feedback of a data transmission from the Tx UE 110 to the Rx UE 120. One of the A/N resources can be selected at the Rx UE 120 based on a predefined rule to indicate a channel condition or a geographical location of the Rx UE 120. When the Tx UE 110 detects the HARQ feedback over the selected A/N resource, the Tx UE 110 can know the channel condition or the geographical location of the Rx UE 120. Accordingly, the Tx UE 110 can adaptively conduct a link adaptation or beamforming for a next data transmission or retransmission.

The process 100 can include steps from S130 to S138.

At S130, a configuration of a set of A/N resources and a rule for selection from the configured A/N resources is transmitted from the Tx UE 110 to the Rx UE 120. The A/N resources can be a set of radio resources orthogonal with each other in time domain, frequency domain, and/or code domain. The configuration can indicate timings, frequencies, or sequences corresponding to the set of A/N resources. The configuration can be used to schedule the A/N resources in a semi-persistent way or dynamically. For example, the configuration can be carried in a physical sidelink control channel (PSCCH) over the sidelink Or, the configuration can be transmitted in advance, and later activated. Based on the configuration, and possibly in combination with other information (e.g., frequency or time location of received data, identify (ID) of a source UE, ID of a destination UE, and the like), the Rx UE 120 can determine the set of A/N resources.

The rule for selecting an A/N resource from the set of A/N resources, for example, can specify how different A/N resources are mapped to different channel conditions or geographical locations of the Rx UE 120, such that different A/N resources can be selected to indicate the corresponding channel conditions or geographical locations.

In an example, instead of configuring the set of A/N resources and the selection rule from the Tx UE 110, the configuration can be provided from a BS (e.g., via RRC signaling) when the Tx UE 110 and Rx UE 120 are within a coverage of a cellular system. After the UEs 110 or 120 moves out of the coverage of the cellular system, the configuration can still be stored and used. In an example, the configuration is built into the Tx UE 110 or the Rx UE 110 (e.g., stored in a subscriber identity module (SIM)), and no signaling of the configuration is performed.

At S132, a set of data is transmitted from the Tx UE 110 to the Rx UE 120. A set of radio resources can be scheduled by a BS serving the Tx UE 110, or determined by the Tx UE 110 for the data transmission. Using those radio resources, the data carried in a physical sidelink shared channel (PSSCH) and a sidelink control information (DCI) carried in a physical sidelink control channel (PSCCH) can be transmitted from the Tx UE 110 to the Rx UE 120. The Rx UE 120 may detect and decode the PSCCH and PSSCH to obtain the transmitted data. For example, by verifying a cyclic redundancy check (CRC), the Rx UE 120 may determine if the data has been decoded successfully.

At S134, one of the A/N resources is selected by the Rx UE 120 for a HARQ feedback of the reception of the data transmitted at S132. The selection can be based on the selection rule configured at S130. For example, depending on a channel condition of a channel over which the data is transmitted at S132, or a geographical location of the Rx UE 120, one of the A/N resources can be selected according to the selection rule.

At S136, the HARQ feedback is transmitted from the Rx UE 120 to the Tx UE 110 over the selected A/N resource. In an example, the data transmission at S132 is a groupcast among a group of UEs, and the selected A/N resource may be shared by multiple UEs. Accordingly, only NACK is transmitted, and no ACK is feedback. As a result, signals of multiple NACKs may overlap each other over the selected A/N resource. In another example, the data transmission at S132 is a unicast, and the selected resource is dedicated to the Rx UE 120. Accordingly, a NACK or ACK can be transmitted over the selected A/N resource depending on the success or failure of decoding the transmitted data at S132.

At S138, the Tx UE 110 may check the set of A/N resources configured at S130 to determine which A/N resource has been selected, and accordingly perform, for example, a link adaptation or a beam forming to conduct a next data transmission (or retransmission).

For example, the selection rule configured at S130 may specify a mapping relationship between ranges of channel quality indicator (CQI) index values and different A/N resources. Accordingly, the Tx UE 110 may determine a CQI index range indicated by the selected A/N resource, and, based on the determined CQI index range, adjust a modulation and coding scheme (MCS) index to have a lower MCS index value for the next data transmission to the Rx UE 120. The lower MCS index corresponds to a lower modulation order and a smaller transport block size.

For example, when the determined CQI index range includes higher CQI index values, the MCS index value can be lowered with a larger step with respect to a current MCS index. In contrast, when the determined CQI index range includes smaller CQI index values, the MCS index value can be lowered with a smaller step with respect to the current MCS index. With the reduced MCS index value, the Rx UE 120 may have a higher probability to successfully decode data of the next data transmission (or retransmission).

In another example, the selection rule configured at S130 may specify a mapping relationship between geographical locations of the Rx UE 120 and the A/N resources. Accordingly, based on the selected A/N resource, the Tx UE 130 may derive the geographical location of the Rx UE 120, and perform a directional data retransmission, for example, by beam forming. The process 100 may terminate after S138.

In the above examples, or other examples in this disclosure, a Tx UE is used to describe the HARQ scheme of selecting an A/N resource based on a preconfigured rule for selection. However, the HARQ scheme disclosed herein can also be applicable to a BS that functions in place of the Tx UE as described in this disclosure.

For example, the BS performing the HARQ scheme can be an implementation of a gNB specified in the 3rd Generation Partnership Project (3GPP) New Radio (NR) standards, or can be an implementation of an eNB specified in 3GPP Long Term Evolution (LTE) standards. Accordingly, the BS can communicate with the Rx UE 120 via a radio interface (e.g., a Uu interface) according to respective wireless communication protocols. Alternatively, the BS may implement other types of standardized or non-standardized radio access technologies, and communicate with the Rx UE 120 according to the respective radio access technologies.

For example, when a BS 111 is used in place of the Tx UE 110 in the FIG. 1 example, the process 100 can be carried out in a similar way with some differences. Examples of the differences are as follows.

At S130, the configuration of the A/N resources and the selection rule can be configured to the Rx UE 120 via system information broadcasting, radio resource control (RRC) signaling, media access (MAC) layer control element (CE) signaling, transmission of downlink control information (DCI), or a combination thereof.

At S132, the data can be transmitted over a physical downlink shared channel (PDSCH) scheduled by a physical downlink control channel (PDCCH). In some examples, the PDCCH may carry information indicating the set of A/N resources based on the configuration conveyed at S130.

At S136, the HARQ feedback can be carried in a physical uplink shared channel (PUSCH) or a physical uplink control channel (PUCCH).

At S138, the link adaptation or beamforming can be performed at the BS 111. The data retransmission can be performed over a downlink between the BS 111 and the Rx UE 120.

Figure 2:
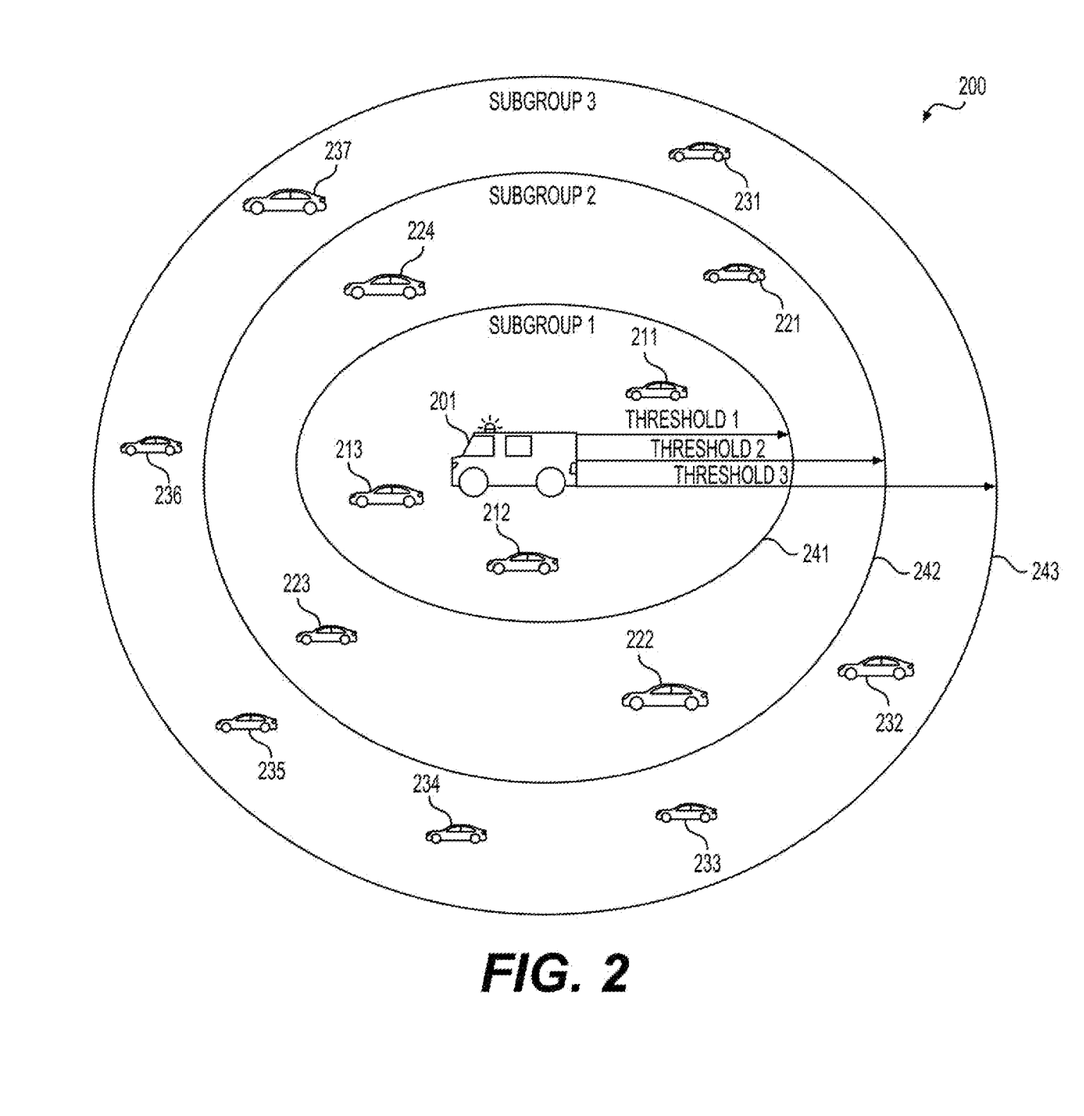
FIG. 2 illustrates a group-based A/N resource allocation mechanism according to some embodiments of the disclosure.

FIG. 2 illustrates a group-based A/N resource allocation mechanism 200 according to some embodiments of the disclosure. In FIG. 2, a Tx UE 201 (e.g., a vehicle) performs a groupcast to a group of Rx UEs (e.g., vehicles) 211-237 (referring to 211-213, 221-224, and 231-237) surrounding the Tx UE 201. The groupcast can be based on the HARQ scheme described in the FIG. 1 example.

Specifically, a set of A/N resources, and an A/N resource selection rule can be signaled from the Tx UE 201 to the Rx UEs 211-237 or preconfigured to the Rx UEs 211-237. The selection rule can specify a mapping relationship between ranges of a channel condition indicator and different A/N resources. For example, a series of thresholds corresponding to the channel condition indicator can be specified and used to partition values of the channel condition indicator into different ranges. Each such range is mapped to an A/N resource.

In various embodiments, the channel condition indicator can be a CQI, a reference signal received power (RSRP), a reference signal received quality (RSRQ), a path loss, a distance, or the like, that is determined at the respective Rx UE 211-237 with respect to the Tx UE 201.

FIG. 2 also shows a set of contour lines 241-243 each correspond to one of the series of thresholds (e.g., thresholds 1-3) specified in the selection rule.

When one of the Rx UEs 211-237, such as the Rx UE 232, detects a groupcasted data from the Tx UE 201 but fails to decode the groupcasted data, the Rx UE 232 may select an A/N resource based on the selection rule configured by the Tx UE 232 for transmission of a HARQ feedback (e.g., a NACK). For example, the Rx UE 232 may determine a channel condition indicator value that falls between the threshold 2 and the threshold 3. Accordingly, an A/N resource corresponding to the range defined by the thresholds 2 and 3 can be selected.

In a similar way, other Rx UEs among the UEs 211-237, when decoding of the groupcasted data fails, may determine a range of the channel condition indicator, and select an A/N resource corresponding to the determined range to transmit a HARQ feedback (e.g., a NACK).

As a result of the above A/N resource selection process, in FIG. 2, the group of Rx UEs 211-237 can be categorized into three subgroups partitioned by the contour lines 241-243: Subgroup 1 including Rx UEs 211-213, Subgroup 2 including Rx UEs 221-224, and Subgroup 3 including Rx UEs 231-237. Each subgroup of Rx UEs can have channel condition indicator values within a same range of the channel condition indicator, and share the same A/N resource. However, between different subgroups, different A/N resources are employed.

Compared with configuring a common A/N resource shared among all Rx UEs 211-237 involved in the groupcast communication, the above group-base A/N resource allocation mechanism can distinguish different sub-groups according to the respective channel conditions or geographical locations (as described below). Accordingly, a data retransmission can be performed in a more efficient way, for example, by employing a link adaptation or beam forming. Compared with configuring dedicated A/N resources for each Rx UEs 211-237 involved in the groupcast, corresponding signaling overhead and A/N resource allocation complexity can be reduced by employing the above group-based A/N resource allocation mechanism.

Figure 3:
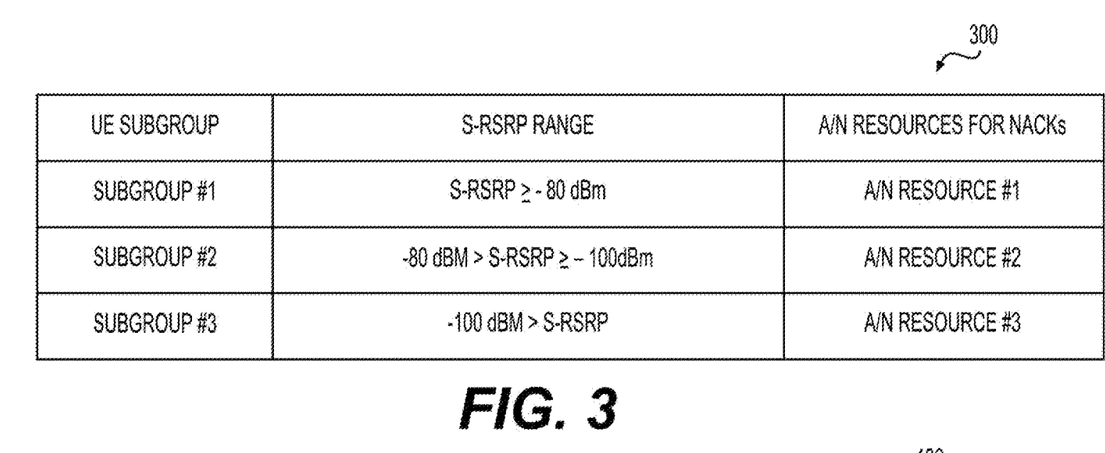
FIG. 3 shows an example A/N resource selection rule that can be used in the FIG. 2 example.

FIG. 3 shows an example A/N resource selection rule 300 that can be used in the FIG. 2 example. In the selection rule 300, RSRP over a sidelink (denoted by S-RSRP) is used as a channel condition indicator. For example, by measuring a reference signal transmitted from the Tx UE 201, a Rx UE in FIG. 2 can determine an S-RSRP for the sidelink between the Tx UE 201 and the respective Rx UE.

The selection rule 300 specifies three S-RSRP ranges: (i) S-RSRP>=−80 dBm, (ii) −80 dBm>S-RSRP>=−100 dBm, and (iii) −100 dBm>S-RSRP. Each S-RSRP range is assigned a specific A/N resource from #1 to #3. Based on the S-RSRP ranges and an S-RSRP measured, the Rx UEs 211-237 can be categorized into three subgroups from subgroup #1 to subgroup #3 shown in FIG. 2.

With configuration of the selection rule 300, when decoding of the groupcasted data from the Tx UE 201 is failed, the respective Rx UE 211-237 can select the respective A/N resource based on the S-RSRP measured at this Rx UE. The Rx UEs belonging to a same subgroup would share the same A/N resource assigned to the subgroup for transmitting one or more NACKs. Different groups of Rx UEs would use different A/N resources #1, #2, or #3.

In an example, based on the NACKs carried in the different A/N resources, a link adaptation can be performed for data retransmission at the Tx UE 201. For example, if the NACKs are received in all three A/N resources #1-#3, it can be determined a current MCS index used in the preceding groupcast is significantly high. A smaller MCS index can be selected with a large step with respect to the current MCS index in an MCS table. In contrast, if the NACKs are received only from the A/N resource #3, it can be determined the current MCS index is slightly high. A smaller MCS index can be selected with a small step with respect to the current MCS index in the MCS table.

In another example, based on the NACKs carried in the different A/N resources, the Tx UE 201 can determine whether or how to perform the data retransmission. For example, if the NACKs are received in all three A/N resources #1-#3, the Tx UE 201 can determine to perform the data retransmission (another round of groupcast). In contrast, if the NACKs are received only from the A/N resources #3, the Tx UE 201 can determine to schedule a Rx UE near subgroup #3 (e.g., the Rx UE in subgroup #2) to perform the data retransmission assuming the Tx UE 201 has the knowledge of locations of the Rx UEs 211-237. In an example, HARQ feedbacks of the data retransmission from subgroup #3 can still be transmitted to the Tx UE 201 based on the A/N resource selection rule, such that the TxUE 201 can accordingly perform a next retransmission or new transmission.

Figure 4:
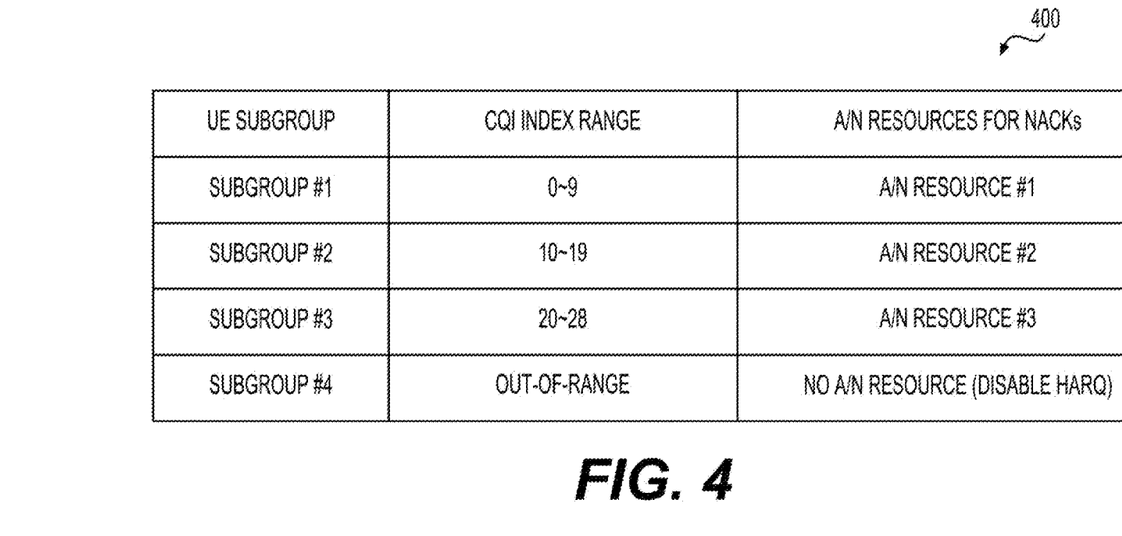
FIG. 4 shows another example A/N resource selection rule that can be used in the FIG. 2 example.

FIG. 4 shows another example A/N resource selection rule 400 that can be used in the FIG. 2 example. In the selection rule 400, CQI is used as a channel condition indicator. For example, an assumption for CQI derivation (e.g., based on 1 or 2 layers of multi-input and multi-output (MIMO), or based on certain transmission schemes) can be configured to the Rx UEs 211-237. The Rx UEs 211-237 can each determine a CQI based on a reference signal received from the Tx UE 201.

The selection rule 400 specifies four CQI ranges: (i) 0-9, (ii) 10-19, (iii) 20-28, and (iv) out-of-range. Based on the CQI ranges and the derived CQI, the Rx UEs 211-237 can be categorized into 4 subgroups from subgroup #1 to subgroup #4 (subgroup #4 is not shown in FIG. 2). For CQI ranges (i) to (iii), each CQI range is assigned a specific A/N resource from #1 to #3. For CQI range (iv), no A/N resource is assigned, and HARQ feedback is disabled.

In a way similar to the usage of the selection rule 300, with the selection rule 400, the Tx UE 201 can perform link adaptation and data retransmission based on the NACKs carried in the different A/N resources.

Figure 5:
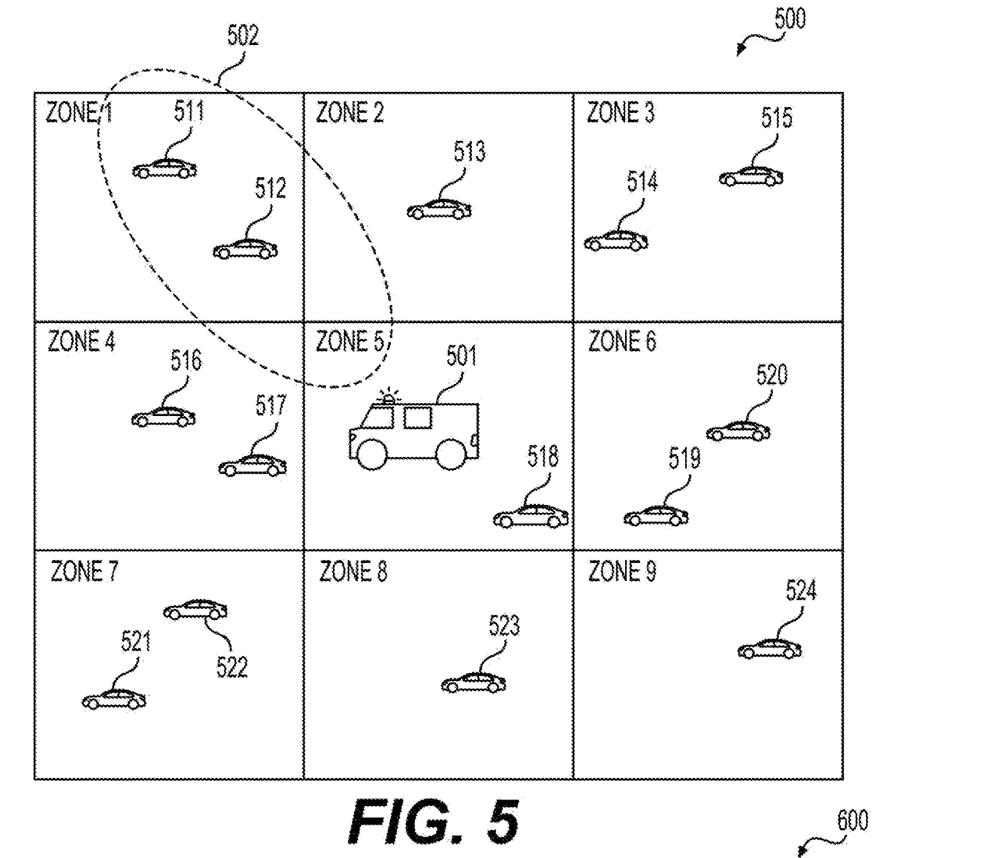
FIG. 5 shows another group-based A/N resource allocation mechanism according to some embodiments of the disclosure.

FIG. 5 shows another group-based A/N resource allocation mechanism 500 according to some embodiments of the disclosure. In FIG. 5, a Tx UE 501 (e.g., a vehicle) performs a groupcast to a group of Rx UEs (e.g., vehicles) 511-524 surrounding the Tx UE 501. The groupcast in FIG. 5 can be based on the HARQ scheme described in the FIG. 1 example. A/N resources for HARQ feedback can be selected based on geographical locations of the Rx UEs 511-524.

Specifically, a region covered by signals from the Tx UE 501 can be partitioned into zones. As a particular example as shown in FIG. 5, the region surrounding the Tx UE 501 is partitioned into nine zones of a square shape from zone 1 to zone 9. The Tx UE 501 is located at the center of the nine zones, while the Rx UEs 511-524 are distributed in the nine zones.

Figure 6:
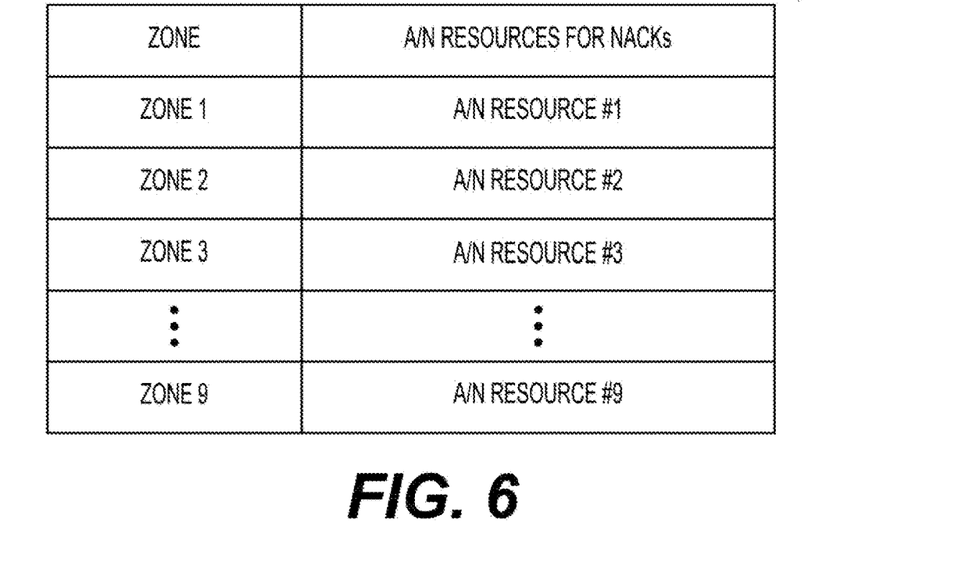
FIG. 6 shows another example A/N resource selection rule that can be used in the FIG. 5 example.

Corresponding to the above zone partition, an A/N resource selection rule 600 as shown in FIG. 6 can specify a mapping relationship between the zones 1-9 and different A/N resources from #1 to #9.

The region partition and the corresponding selection rule 600 can be configured from the Tx UE 501 to the Rx UEs 511-524. For example, a configuration indicating a center location and a size of each zone can be provided to the Rx UEs 511-524. Each Rx UE 511-524 can determine its own location, for example, by a Global Positioning System (GPS) receiver equipped at the respective Rx UE. Accordingly, each Rx UE 511-524 can determine which zone it belongs to. Based on the selection rule 600, an A/N resource can be selected from the A/N resources from #1 to #9 to transmit a NACK at the respective Rx UE when decoding of data groupcasted from the Tx UE 501 is failed.

In a first example, based on the NACKs carried in the different A/N resources selected based on the geographical locations of the respective Rx UEs, the Tx UE 501 can perform a directional data retransmission. For example, the Rx UE 151 transmits a NACK over the A/N resource #1. By detecting the NACK being carried over the A/N resource #1, the Tx UE 501 can determine to perform a directional data retransmission towards zone (e.g., over a beam 502), because the A/N resource #1 corresponds to zone 1 as specified by the selection rule 600.

In a second example, instead of performing the data retransmission at the Tx UE 501, the Tx UE 501 can schedule the Rx UE 513 or 516 to perform a data retransmission (data forwarding) that is closer to zone 1 compared with the Tx UE 501.

As can be seen, in the FIG. 2 example, the UE subgroup partition is omnidirectional (e.g., values of the channel condition indicators CQI, RSRP, RSRQ, or path loss generally decreases according to a distance from the Tx UE 201 in all directions). In contrast, the subgroup partition in the FIG. 5 example is directional, which enables directional data retransmissions, and improves performance of the data retransmissions.

It is noted that various methods for partitioning a region into zones can be used in various embodiments that can be different from what is illustrated in FIG. 5. For example, sector-based partition can be used in some examples.

While the FIG. 2 example and FIG. 5 example are described in the context of groupcasting, the related schemes and mechanisms are also applicable to scenarios of unicasting. For example, in a unicast from a Tx UE to a Rx UE, the Rx UE can select an A/N resource from a set of dedicated resources configured for this Rx UE based on a selection rule in a similar way as in groupcasting. Based on the selected A/N resource, the Tx UE can also perform a link adaptation and/or beamforming to conduct a data retransmission in a way similar to that in groupcasting.

Figure 7:
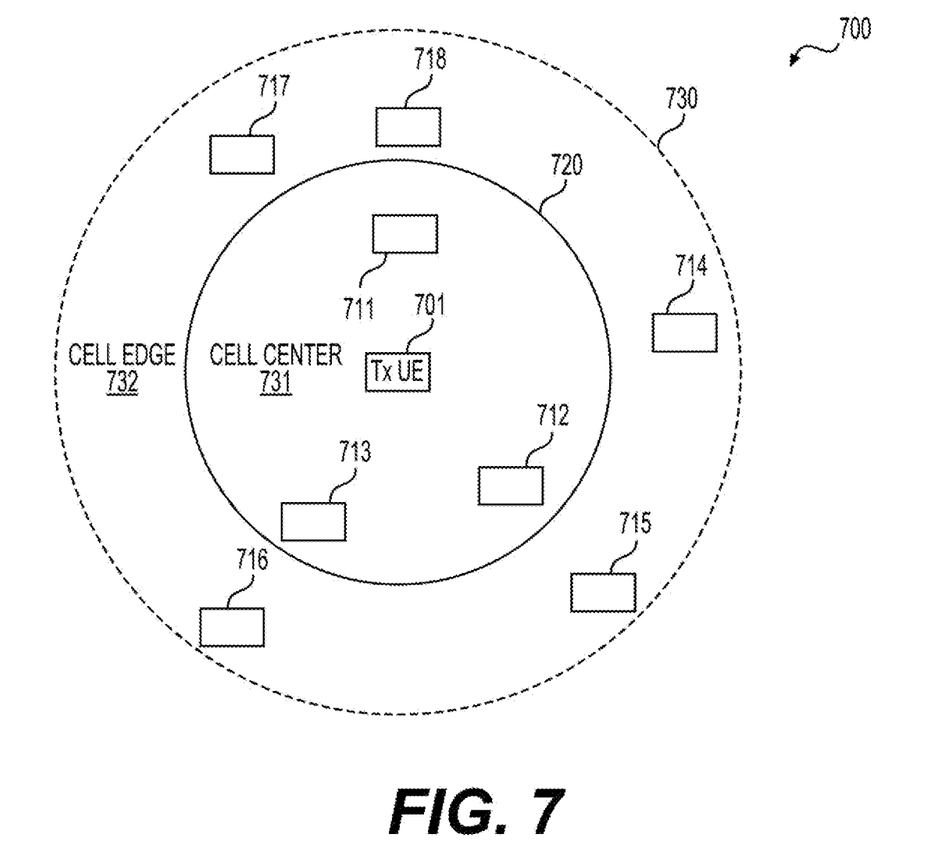
FIG. 7 shows a hybrid A/N resource allocation mechanism according to some embodiments of the disclosure.

FIG. 7 shows a first hybrid A/N resource allocation mechanism 700 according to some embodiments of the disclosure. In the hybrid mechanism 700, a group of Rx UEs can be categorized into two or more subgroups. At least one subgroup of Rx UEs share a common A/N resource for HARQ feedback, while at least another subgroup of Rx UEs are each assigned a dedicated A/N resource for HARQ feedback. Thus, common A/N resources and dedicated resources are used in a hybrid way.

For example, in a hybrid A/N resource selection rule, values of a channel condition indicator (e.g., CQI, RSRP, RSRQ, distance, path loss, or the like) can be partitioned into two ranges based on a threshold. The range having values above the threshold can be mapped to a common resource, while the range having values below the threshold can be mapped to multiple dedicated resources.

Based on the above hybrid selection rule, the common resource can be selected for HARQ feedback if a channel condition indicator value at a Rx UE is above the threshold, while one of the dedicated resource can be selected if a channel condition indicator value at the Rx UE is below the threshold. In an example, the dedicated A/N resource can be determined implicitly according to a rule configured to the Rx UE. The rule, for example, can specify a mapping relationship between a dedicated A/N resource and a Rx UE ID, a Tx UE ID, radio resources used for respective data transmission, and/or possibly other parameters.

In the FIG. 7 example, a Tx UE 701 performs groupcasting to a group of Rx UEs 711-718. Signals of the Tx UE 701 cover a serving region 730 of the Tx UE 701 that is referred to as a cell 730 of the Tx UE 701. A contour line 720 can correspond to a threshold that partitions channel condition indicator values into two ranges as described above. The contour line 720 partitions the cell 730 into a cell center area 731 and a cell edge area 732 which correspond to the two ranges of the channel condition indicator, respectively.

Based on a channel condition indicator value determined locally, each Rx UE 211-218 can determine whether the Rx UE is located at the cell center area 731 or the cell edge area 732. Accordingly, the Rx UE can select the common resource or one of the dedicated resources for HARQ feedback. For example, one or more of the Rx UEs 711-713 at the cell center region 731 may select the common resource and transmit one or more NACKs when decoding of groupcasted data is failed, while one or more of the Rx UEs 714-718 at the cell edge region 731 may each select a dedicated resource to transmit an ACK or NACK depending on whether decoding of the groupcasted data is successful.

At the Tx UE 701, by detecting the ACKs or NACKs carried in the common or dedicated resources, the Tx UE 701 can have a knowledge of distributions of the Rx UEs with failed data receptions. For example, the Tx UE 701 can identify Rx UEs with failed data receptions at the cell edge area 732, and accordingly perform link adaptation and/or beamforming to conduct one or more data retransmissions to those Rx UEs at the cell edge area 732. In contrast, when only a common resource are used for HARQ feedback of all Rx UEs 711-718, the Tx UE 701 cannot know which Rx UEs the NACKs come from, and retransmission targeting a specific Rx UE cannot be performed, resulting in a lower data retransmission performance.

In an embodiment, a second hybrid A/N resource allocation mechanism is employed. In the second hybrid A/N resource allocation mechanism, a group of Rx UEs involved in a groupcast of a Tx UE can be separated into subgroups, for example, based on geographical areas. Within each subgroup, a head UE can be selected. The head UE can be assigned a dedicated resource for carrying ACK/NACK, or only ACK, while the other Rx UEs within the same subgroup can be assigned a common resource for carrying NACKs. During the groupcasting, when the Tx UE receives an ACK carried in the dedicated resource of a subgroup but receives NACKs carried in the common resource of the same subgroup, the Tx UE can schedule the head UE to perform a data retransmission (or data forwarding). As the Tx UE is close to the Rx UEs within the same group, the data retransmission can be performed more efficiently.

Using FIG. 2 as an example of the second hybrid allocation mechanism, the value ranges of a channel condition indicator (e.g., CQI, RSRP, RSRQ, distance, path loss, and the like) can be used as a criterion for separating the group of UEs 211-237 into the three subgroups. For example, each Rx UE 211-237 can report a measure of the channel condition indicator to the Tx UE 201. Based on the criterion, the Tx UE 201 can organize the Rx UEs 211-237 into subgroups #1-#3.

In addition, one or more head UEs can be selected for each subgroup based on the reported channel condition indicator measures. For example, a Rx UE with a best channel condition indicator measure can be selected to be the head UE. Alternatively, a head UE can be selected for each subgroup based on capabilities of the Rx UEs within the same subgroup, or other standards. Other methods can be employed in other examples.

The Tx UE 201 may accordingly configure dedicated resources to the head UEs of each subgroup, and common resources to each subgroup by signaling to the Rx UEs 211-237. With the configuration of the hybrid A/N resources, the Rx UEs 211-237 can accordingly perform HARQ feedback with the assigned A/N resources.

Similarly, using FIG. 5 as another example of the second hybrid allocation mechanism, the geographical locations of the Rx UEs 511-524 can be used to form subgroups corresponding to different zones, and designate a head UE for each such subgroup. The second hybrid A/N resource allocation mechanism can then be applied to the subgroups.

In an embodiment, a third hybrid A/N resource allocation mechanism is employed. In the third hybrid A/N resource allocation mechanism, whether a common resource or dedicated A/N resources are used depends on a number of Rx UEs involved in a groupcast from a Tx UE. For example, when the number of Rx UEs is above a threshold, the common resource is shared by the Rx UEs. Otherwise, dedicated resources are used by each Rx UE when HARQ feedback is needed.

For example, the Tx UE conducting the groupcasting can have knowledge of the number of Rx UEs by receiving reports from the Rx UEs. Accordingly, the Tx UE can determine which type of A/N resources is to be used, and configure the corresponding A/N resource to the Rx UEs.

Aspects of the disclosure provide methods for channel state information (CSI) acquisition useful for link adaptation at a Tx UE or BS.

In an embodiment, CSI includes a channel condition component (e.g., corresponding to a channel transmission matrix H modeling a channel response of a wireless channel) and an interference/noise level component (e.g., corresponding to a noise vector modeling interference/noise over the wireless channel). The two components can be measured at a Rx UE, and used to derive a parameter indicating the CSI.

In an example, at the Rx UE, the channel condition component is acquired based on a short-timescale measurement performed in a (pre-)configured or derived time occasion(s), whereas the interference/noise level component is performed based on either a long or short timescale measurement depending on an interference/noise situation observed from channel sensing results (e.g., a sending history). For example, when a high interference level and/or fast interference changes are observed from a sensing history, the long timescale measurement can be employed. In contrast, when a low interference level and/or slow interference changes are observed from the sensing history, the short timescale measurement on interference/noise can be employed. In this way, CSI can be suitably captured in V2X communication for efficient link adaptation corresponding to different interference/noise situation.

In an example, the sensing history can include N samples of reference signal measurement (e.g., RSSI) collected from past X ms/slots/subframes/frames. In an example, a standard deviation is derived from the N samples. If the standard deviation is quite large (e.g., larger than a threshold configured by the Tx UE, the BS, a group head device, or pre-configured), which indicates a fast change of the interference/noise level, the long timescale average over Y ms is applied for deriving the interference/noise component for CSI acquisition. On the contrary, if the standard deviation is quite small (i.e., less than the threshold), which indicates the interference/noise level is quite stable, the short timescale filtering/averaging can be applied for the interference/noise component derivation.

In an example, an outage ratio is defined for indicating how fast the interference/noise changes. Specifically, when a difference of the reference signal measurement (e.g., RSSI) between N consecutive (e.g., 2) samples is larger than a threshold configured by a network (e.g., the BS) or pre-configured, an outage sample is counted. Then an outage ratio can be determined as follows, Outage ratio=outage samples/total samples.

Such outage ratio can reflect how dynamical the interference/noise changes. Accordingly, the outage ratio can be used as a criterion to determine a filtering/averaging scheme for calculating an interference/noise component in deriving the CSI. A threshold of the outage ratio for determining whether to perform a long or short timescale averaging can be configured by the Tx UE, the network (e.g., BS), a group head device, or pre-configured in device.

The timescale for the long timescale and short timescale measurement can be provided by the Rx UE, the network, the group head device or pre-configured.

In some examples, different CQI tables are used for a long or short timescale measurement based CQI report for deriving a proper MCS at a BS or a Tx UE. For example, in a CQI table corresponding to the long timescale measurement, a gap in dB between two consecutive entries can be small (or large). For a CQI table corresponding to a short timescale measurement, a gap in dB between two consecutive entries can be large (or small).

In other examples, the above two different COI tables are implemented with a single table shared by the long or short timescale measurement based CQI report, but with different step sizes. For example, every entry in a CQI table can be used for CQI reporting corresponding to the short timescale measurement, while every 3 entries can be used for CQI reporting corresponding to the long timescale measurement in the same CQI table.

Figure 8:
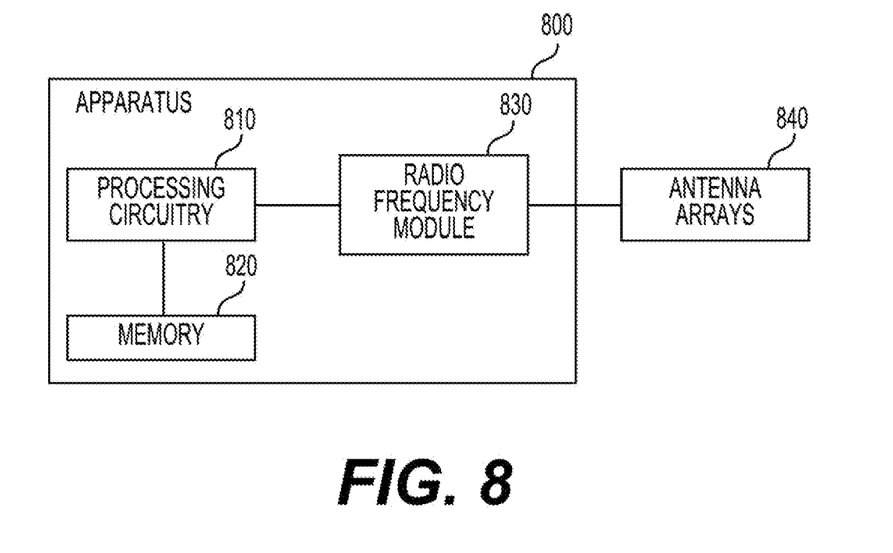
FIG. 8 shows an example apparatus according to embodiments of the disclosure.

FIG. 8 shows an example apparatus 800 according to embodiments of the disclosure. The apparatus 800 can be configured to perform various functions in accordance with one or more embodiments or examples described herein. Thus, the apparatus 800 can provide means for implementation of mechanisms, techniques, processes, functions, components, systems described herein. For example, the apparatus 800 can be used to implement functions of the UEs or BS in various embodiments and examples described herein. The apparatus 800 can include a general purpose processor or specially designed circuits to implement various functions, components, or processes described herein in various embodiments. The apparatus 800 can include processing circuitry 810, a memory 820, and a radio frequency (RF) module 830.

In various examples, the processing circuitry 810 can include circuitry configured to perform the functions and processes described herein in combination with software or without software. In various examples, the processing circuitry 810 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 810 can be a central processing unit (CPU) configured to execute program instructions to perform various functions and processes described herein. Accordingly, the memory 820 can be configured to store program instructions. The processing circuitry 810, when executing the program instructions, can perform the functions and processes. The memory 820 can further store other programs or data, such as operating systems, application programs, and the like. The memory 820 can include non-transitory storage media, such as a read only memory (ROM), a random access memory (RAM), a flash memory, a solid state memory, a hard disk drive, an optical disk drive, and the like.

In an embodiment, the RF module 830 receives a processed data signal from the processing circuitry 810 and converts the data signal to beamforming wireless signals that are then transmitted via antenna arrays 840, or vice versa. The RF module 830 can include a digital to analog convertor (DAC), an analog to digital converter (ADC), a frequency up convertor, a frequency down converter, filters and amplifiers for reception and transmission operations. The RF module 830 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 840 can include one or more antenna arrays.

The apparatus 800 can optionally include other components, such as input and output devices, additional or signal processing circuitry, and the like. Accordingly, the apparatus 800 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method, comprising:
    receiving data transmitted from a transmission (Tx) user equipment (UE) or a base station (BS) over a channel at a reception (Rx) UE;
    selecting an acknowledgement/negative acknowledgement (A/N) resource from a set of A/N resources for a hybrid automatic repeat request (HARQ) feedback of the data based on a channel quality indicator (CQI) of the channel measured at the Rx UE, wherein the selected A/N resource is mapped to a range of the CQI; and
    transmitting the HARQ feedback with the selected A/N resource.

2. The method of claim 1, further comprising:
    receiving a rule for selecting the A/N resource from the set of A/N resources from the Tx UE or BS, the rule indicating the A/N resource being selected based on a (pre-) configured mapping relationship between different ranges of a channel condition indicator and the set of A/N resources.

3. The method of claim 2, wherein the channel condition indicator is at least one of:
    the CQI,
    a distance between the Tx UE or BS and the Rx UE,
    a reference signal received power (RSRP),
    a reference signal received quality (RSRQ), or
    a path loss.

4. The method of claim 1, wherein a region surrounding the Tx UE or BS is partitioned into zones, and
    one of the zones that includes a geographical location of the Rx UE is determined based on the geographical location of the Rx UE, and an A/N resource is selected based on the one of the zones.

5. The method of claim 4, wherein the transmitting includes:
    performing a beamforming towards the zone where the Rx UE is located.

6. The method of claim 1, wherein the set of A/N resources include a common resource shareable among UEs, and a dedicated resource configured for the Rx UE,
    a cell representing a serving area of the Tx UE or BS is partitioned into a cell center region and a cell edge region, and
    the common resource is selected when the Rx UE is located at the cell center region, and the dedicated resource is selected when the Rx UE is located at a cell edge region.

7. The method of claim 1, wherein the set of A/N resources is a set of common resources each shareable among UEs in a groupcast communication.

8. The method of claim 1, wherein the set of A/N resources is a set of dedicated resources configured for the Rx UE.

9. The method of claim 1, wherein a rule for selecting the A/N resource from the set of A/N resources is received from the Tx UE or BS, preconfigured to the Rx UE, or indicated by physical control channel, and
    the set of A/N resources is indicated by a configuration received from the Tx UE or BS, is preconfigured to the Rx UE, or indicated by physical control channel.

10. The method of claim 1, wherein the HARQ feedback is one of:
    a negative acknowledgement (NACK) only HARQ feedback, or
    an acknowledgement (ACK) or NACK feedback.

11. The method of claim 1, further comprising:
    acquiring a channel condition component of channel state information (CSI) of the channel based on a measurement over a first predefined short timescale; and
    acquiring an interference/noise level component of the CSI of the channel based on a measurement over a second predefined short timescale or a predefined long timescale depending on a sensing history of interference/noise over the channel.

12. The method of claim 11, wherein the acquiring the interference/noise level component includes:
    acquiring the interference/noise level component of the CSI of the channel based on the measurement over the second predefined short timescale when the interference/noise over the channel changes slow compared with a threshold; and
    acquiring the interference/noise level component of the CSI of the channel based on the measurement over the predefined long timescale when the interference/noise over the channel changes fast compared with the threshold.

13. The method of claim 11, further comprising:
    reporting the CSI using a first and a second channel quality indicator (CQI) tables corresponding to the measurements of the second predefined short timescale and the predefined long timescale, respectively.

14. The method of claim 13, wherein a gap between two consecutive entries of the first CQI table is larger than that of the second CQI table.

15. A method, comprising:
    transmitting a configuration from a transmission (Tx) user equipment (UE) or a base station (BS) to a reception (Rx) UE in a wireless communication system, the configuration indicating a rule for selecting an acknowledgement/negative acknowledgement (A/N) resource from a set of A/N resources for a hybrid automatic repeat request (HARQ) feedback based on a channel quality indicator (CQI) of a channel between the Tx UE or BS and the Rx UE, the A/N resource being mapped to a range of the CQI;
    transmitting data to the Rx UE over the channel; and
    receiving a first HARQ feedback corresponding to the transmitted data from the Rx UE, the first HARQ feedback being carried in a first A/N resource selected from the set of A/N resources according to the rule.

16. The method of claim 15, wherein the rule specifies a mapping relationship between the set of A/N resources and different ranges of a channel condition indicator of the channel between the Tx UE or BS and the Rx UE.

17. The method of claim 15, wherein the rule specifies a mapping relationship between zones and the set of A/N resources, the zones being partitioned from a region surrounding the Tx UE or BS, one of the zones that includes a geographical location of the Rx UE is determined based on the geographical location of the Rx UE, an A/N resource being selected based on the one of the zones.

18. The method of claim 15, wherein a cell representing a serving area of the Tx UE or BS is partitioned into a cell center region and a cell edge region, and
the rules includes:
selecting a common resource shareable among UEs when the Rx UE is located at the cell center region, and
selecting a dedicated resource configured for the Rx UE when the Rx UE is located at the cell edge region.

19. The method of claim 15, further comprising one of:
performing a link adaptation based on the selected A/N resource for a data retransmission, or
performing a data retransmission with a beam forming towards a geographic location of the Rx UE.

20. A user equipment (UE), comprising circuitry configured to:
receive data transmitted from a transmission (Tx) UE or a base station (BS) over a channel;
select an acknowledgement/negative acknowledgement (A/N) resource from a set of A/N resources for a hybrid automatic repeat request (HARQ) feedback of the data based on a reference signal received power (RSRP) of the channel measured at the UE, wherein the selected A/N resource is mapped to a range of the RSRP; and
transmit the HARQ feedback with the selected A/N resource.

* * * * *